May 15, 1934.  O. F. SCHWEITZER  1,959,007
WIRE WHEEL CONSTRUCTION
Filed April 14, 1930   3 Sheets-Sheet 1
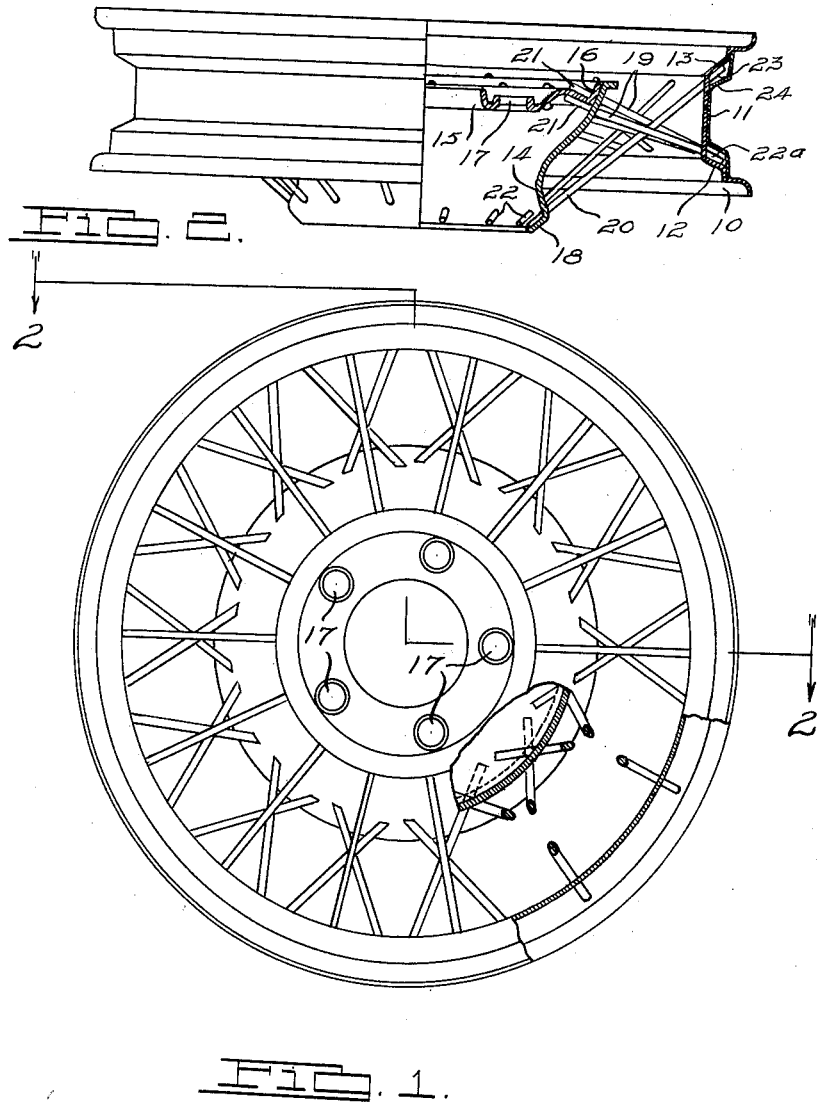
INVENTOR
Orlan F. Schweitzer.
BY
Harness, Dickey, Pierce & Lann
ATTORNEY

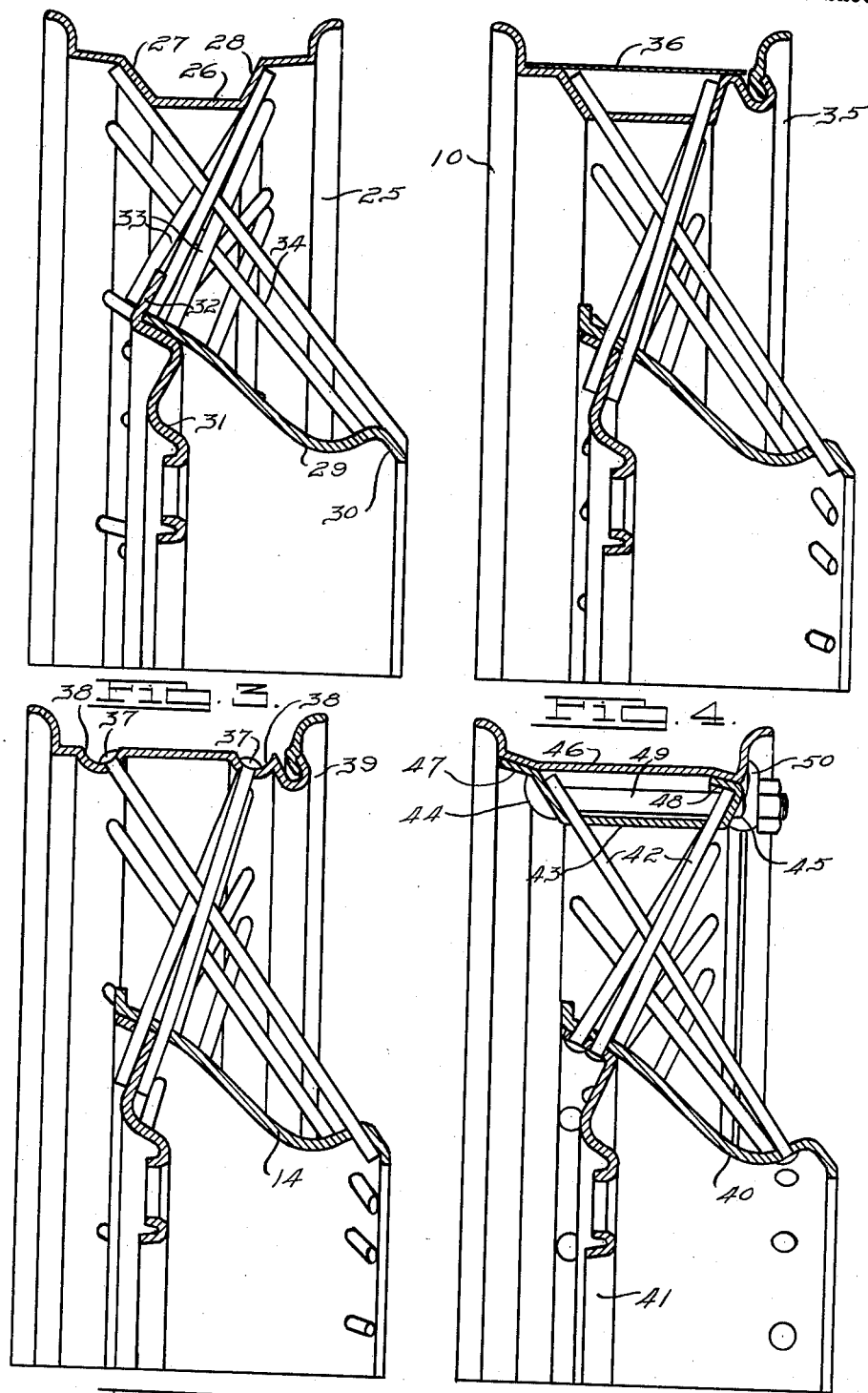

May 15, 1934.　　　O. F. SCHWEITZER　　　1,959,007
WIRE WHEEL CONSTRUCTION
Filed April 14, 1930　　　3 Sheets-Sheet 3
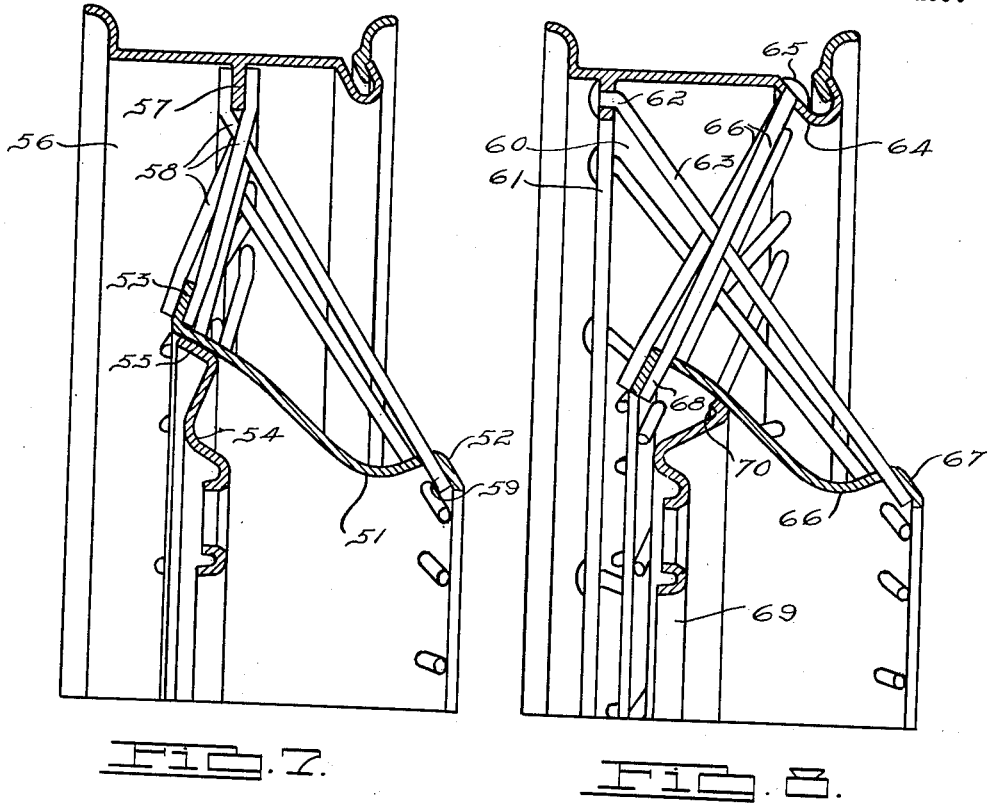
INVENTOR
Orlan F. Schweitzer.
BY
Harness, Dickey, Pierce & Mann,
ATTORNEYS Patented May 15, 1934

1,959,007

UNITED STATES PATENT OFFICE 1,959,007

WIRE WHEEL CONSTRUCTION

Orlan F. Schweitzer, Detroit, Mich.

Application April 14, 1930, Serial No. 443,956

12 Claims. (Cl. 301—55)

This invention relates to wire wheels particularly useful on motor vehicles.

The main objects of this invention are to provide an improved construction of wire wheel which will be strong and durable, economical to manufacture and which will present a clean and finished appearance without the need of subsequent finishing operations now required; to provide an improved wheel in which the spokes are welded along their sides for a substantial distance so as to give the joint a maximum of strength; to provide a construction of wire wheel in which the welded ends of the spokes are concealed from sight and to provide a construction in which the inner ends of the spokes are secured directly to the plate which is to be mounted on the wheel hub.

An illustrative embodiment of this invention is shown in the accompanying drawings, in which Fig. 1 is a view in outer face elevation of the preferred form of my improved wheel, a portion being broken away and shown in section.

Fig. 2 is a view partly in section and partly in elevation taken on the line 2—2 of Fig. 1 looking in the direction indicated by the arrows.

Fig. 3 is a view taken in radial section of a modified form of construction.

Fig. 4 is a similar view of another modified form of construction.

Fig. 5 is a similar view of another modified form.

Fig. 6 is a similar view of another modified form adapted to take a demountable rim.

Fig. 7 is a similar view of another modified form in which the ends of the majority of the spokes are not concealed from view.

Fig. 8 is a similar view of another modified form of construction in which the spokes are welded at one end only.

In the construction shown in Figs. 1 and 2, my improved wheel comprises an outer rim member 10 having a drop center 11, the side walls 12 and 13 of which are inclined with respect to the radial plane of the wheel.

A hub member is provided for the rim 10 and comprises an axially extending shell 14 and a radially extending mounting plate 15, the outer peripheral marginal edge of which is bent transversely to provide a flange 16 which is welded or otherwise suitably secured to the inner end of the shell 14. The plate 15 is provided with a plurality of apertures 17 for receiving the mounting studs on a vehicle wheel permanent hub in the usual manner.

The shell 14 adjacent the plate 15 and adjacent an inclined surface 18 at the outer end of the shell is provided with a series of spoke apertures through which a plurality of spokes 19 and 20, respectively, are adapted to extend and protrude therebeyond. The protruding ends 21 of the spokes 19 are welded along their sides to the plate 15 and the protruding ends 22 of the spokes 20 are welded along their sides to the inclined surface 18.

The drop center portion 11 of the rim 10 is also provided with two series of spoke apertures formed therein closely adjacent to the inclined walls 12 and 13. The outer ends of the spokes 19 extend through the apertures adjacent the wall 12 and the protruding ends 22 thereof are welded to the inclined wall.

Similarly, the outer ends of the spokes 20 extend through the apertures adjacent the inclined wall 13 and the protruding ends 23 thereof are welded along their sides to the inclined wall. A liner 24, having a drop center, is provided for the outer face of the rim 10 so that when a tire and tube is mounted thereon, the tube will not come in contact with the welded ends 22 and 23 of the spokes.

Referring to Fig. 3 of the drawings, an outer rim 25 is provided with a drop center 26 at each side of which are inclined walls 27 and 28. The hub member comprises an axially extending shell 29 having an inclined surface 30 at the outer end thereof and a radially extending mounting plate 31 welded or otherwise suitably secured to the inner end thereof.

The plate 31 extends around the inner end of the shell 29 and terminates in a flange 32 which is inclined with respect to the radial plane of the wheel and substantially in alignment with and formed at the same angle as the inclined side wall 28 of the rim member 25. Spokes 33 have their inner ends welded along their sides to the flange 32 and their outer ends welded to the inner exposed sides of the inclined wall 28. Oppositely inclined spokes 34 have their inner ends welded along their sides to the inclined wall 30 of the hub member 29 and their outer ends welded along their sides to the inner exposed side of inclined wall 27.

Referring to Fig. 4 of the drawings, the construction thereof is substantially the same as that shown in Figs. 1 and 2 except that a removable rim flange 35 is provided for securing the tire and the liner 36 is straight in an axial direction instead of having a drop center.

Referring to Fig. 5 of the drawings, the hub member and arrangement for attaching the inner end of the spokes are substantially the same as that shown in Figs. 1 and 2 of the drawings. The outer ends of the spokes, however, have heads 37 which are housed in suitable grooves 38. This rim member, like that shown in Fig. 4, is provided with a removable flange 39.

Referring to Fig. 6 of the drawings, the inner hub member comprises an axial extending shell 40 to which is welded or otherwise suitably secured an axially extending attaching plate 41 in much the same manner as in the preceding constructions.

The hub member is provided with a series of apertures adjacent the opposite ends thereof, the ones at the inner end extending also through the out-turned flange of the plate 41. These apertures are for the purpose of receiving headed spokes 42, the outer ends of which pass through apertures formed in an outer rim member 43 and the protruding ends of the spokes are welded along their sides to inclined side walls 44 and 45 of the rim 43.

The rim 43 is of the type to take a demountable rim 46 which rests upon inclined surfaces 47 and 48. Bolts 49 having clips 50 thereon are provided at suitably spaced intervals around the rim 43 and pass through axially extending apertures formed in the inclined side walls 44 and 45.

Referring to Fig. 7 of the drawings, the axially extending shell 51 of the hub member is provided at its outer end with a surface 52 inclined to the radial plane of the wheel and at its inner end with an out-turned flange 53 which is also inclined with respect to the radial plane of the wheel, but in the opposite direction. A mounting plate 54 is provided with a peripheral flange 55 which is welded or otherwise suitably secured to the inner side of the shell 51, adjacent its inner flanged edge.

A rim member 56 is provided at its medial point with a radially disposed inwardly extending integrally formed flange 57, to the opposite sides of which are welded the outer ends of a plurality of spokes 58.

The inner ends of some of the spokes 58 are welded along their sides to opposite sides of the shell flange 53 in alternate staggered relation and others of the spokes have their inner ends extending through apertures formed adjacent to the inclined surface 52 and have their protruding ends 59 welded along their sides to the inner face of the inclined surface.

Referring to Fig. 8 of the drawings, an outer rim member 60 is provided adjacent the inner edge thereof with an inwardly extending radially disposed flange 61 through which are provided a plurality of spaced apertures to receive the headed ends 62 of a plurality of spokes 63. The opposite edge of the rim member 60 is provided with an inwardly extending inclined wall 64 which is also provided with a series of spaced apertures to receive the headed ends 65 of spokes 66.

The hub member comprises an axially extending shell 66 having an inclined surface 67 at the outer end thereof and an oppositely inclined wall 68 at the inner end thereof. Two series of spaced apertures are provided in the shell 66 adjacent the inclined walls 67 and 68 through which project the inner ends of the spokes 63 and half of the spokes 66. The other half of the spokes 66 are welded along their sides to the outer face of the flange 68, the arrangement being alternately staggered so that every other one of the spokes is secured to the outer face of the flange and the alternate spokes extend through the apertures and are welded along their sides to the inner face of the flange. A mounting plate 69, having a peripheral flange 70 welded or otherwise suitably secured to the inner side of the shell 66, is provided in the usual manner.

Although several embodiments of this invention have been herein shown and described, it will be understood that numerous other details of the constructions shown may be altered or omitted without departing from the spirit of this invention as defined by the following claims.

I claim:

1. In a wire wheel construction, a rim member, a hub member comprising an axially extending shell and a radially extending mounting plate secured within said shell, said shell having an aperture therein adjacent to said plate, and a spoke having one end secured to said rim and its other end passing through said shell aperture and welded to said plate, in substantial prolongation of the spoke so that the welded portion is subjected to axial stresses only.

2. In a wire wheel construction, a rim member having a drop center with inclined side walls, said drop center having spoke apertures adjacent each inclined side wall, a hub member and wire spokes joining said members, the outer ends of said spokes extending through said apertures and welded along their sides for a substantial linear portion to said inclined side walls, in substantial prolongation of the spoke so that the welded portion is subjected to axial stresses only.

3. In a wire wheel construction, a rim member, a hub member, one of said members having an axially inclined radially extending portion, a series of apertures in such member adjacent said portion and a plurality of spokes each having one end secured to one member and the other end extending through one of said apertures and welded along its side for a substantial linear portion to said portion, said extending welded end being in substantial prolongation of the spoke so that the welded portion is subjected to axial stresses only.

4. In a wire wheel construction, a rim member, a hub member comprising an axially extending shell and a radially extending mounting plate having a substantially radially extending portion, secured within said shell adjacent one end thereof, said shell having a series of apertures adjacent the point of attachment of said plate, the other end of said shell having an axially inclined radially extending portion and two series of wire spokes having their outer ends secured to said rim and the inner ends of one series extending through said apertures and welded along their sides through a substantial linear portion with a radially extending portion of said mounting plate and the inner ends of the other series secured to said axially inclined radially extending portion of the hub.

5. In a wire wheel construction, a rim member, a hub member comprising an axially extending shell and a radially extending mounting plate secured within said shell adjacent the inner end thereof, said shell having a series of apertures adjacent the points of attachment of said plate, the outer end of said shell having an axially inclined radially extending portion and a series of apertures adjacent said portion, and two series of wire spokes having their outer ends secured to said rim and the inner ends of one series extending through said apertures and welded to said mounting plate and the inner ends of the other series extending through the other series of apertures and welded to said axially inclined radially extending portion of the hub.

6. A wheel comprising a hub shell member having a flange at its axially outer end directed inwardly toward the wheel axis, and spokes connected to the shell member, said spokes extending through apertures in the shell adjacent the flange and being welded to the latter along their sides through a substantial linear portion.

7. A wheel comprising a hub shell member having a flange at its axially outer end directed inwardly toward the wheel axis, and spokes connected to the shell member, said spokes extending through apertures in the shell adjacent the flange, and having end portions curvilinear in cross section initially driving the weld and welded along their sides to the flange.

8. In a wire wheel construction, a rim member, a hub member comprising an axially extending shell and a radially extending mounting plate secured within said shell, and a wire spoke having one end secured to the rim, and having a substantial linear portion at its other end welded along its side to a generally, radially directed portion of the mounting plate.

9. In a wire wheel construction, a rim member, a hub member comprising an axially extending shell and a radially extending mounting plate secured within the shell, said shell having an aperture therein adjacent to said plate, and a spoke having one end secured to said rim and its other end passing through said aperture, and having a substantial linear portion welded to the plate, said weld being characterized by such linear portion of the spoke and plate having substantially line contact, initially during welding.

10. A vehicle wheel comprising a hub shell and rim inter-connected by spokes, and a member having a radially extending portion telescoping within said hub shell, one series of spokes passing through said hub shell and line welded along their cylindrical faces to said radially extending portion.

11. A vehicle wheel comprising a hub shell and a rim interconnected by spokes, and a member telescoping within said hub shell and having at its innermost portion a flange extending toward the axial center and paralleling in general the direction of one series of spokes, said series of spokes passing through said hub shell and secured to said flange at the location where they are parallel to the flange.

12. A vehicle wheel comprising a hub shell and a rim interconnected by spokes, and a member telescoping within said hub shell and having its innermost portion extending at substantially the same angle with respect to the axis of the wheel as one series of spokes, said series of spokes passing through said hub shell and welded to said innermost portion of said member.

ORLAN F. SCHWEITZER.